Patented June 19, 1928.

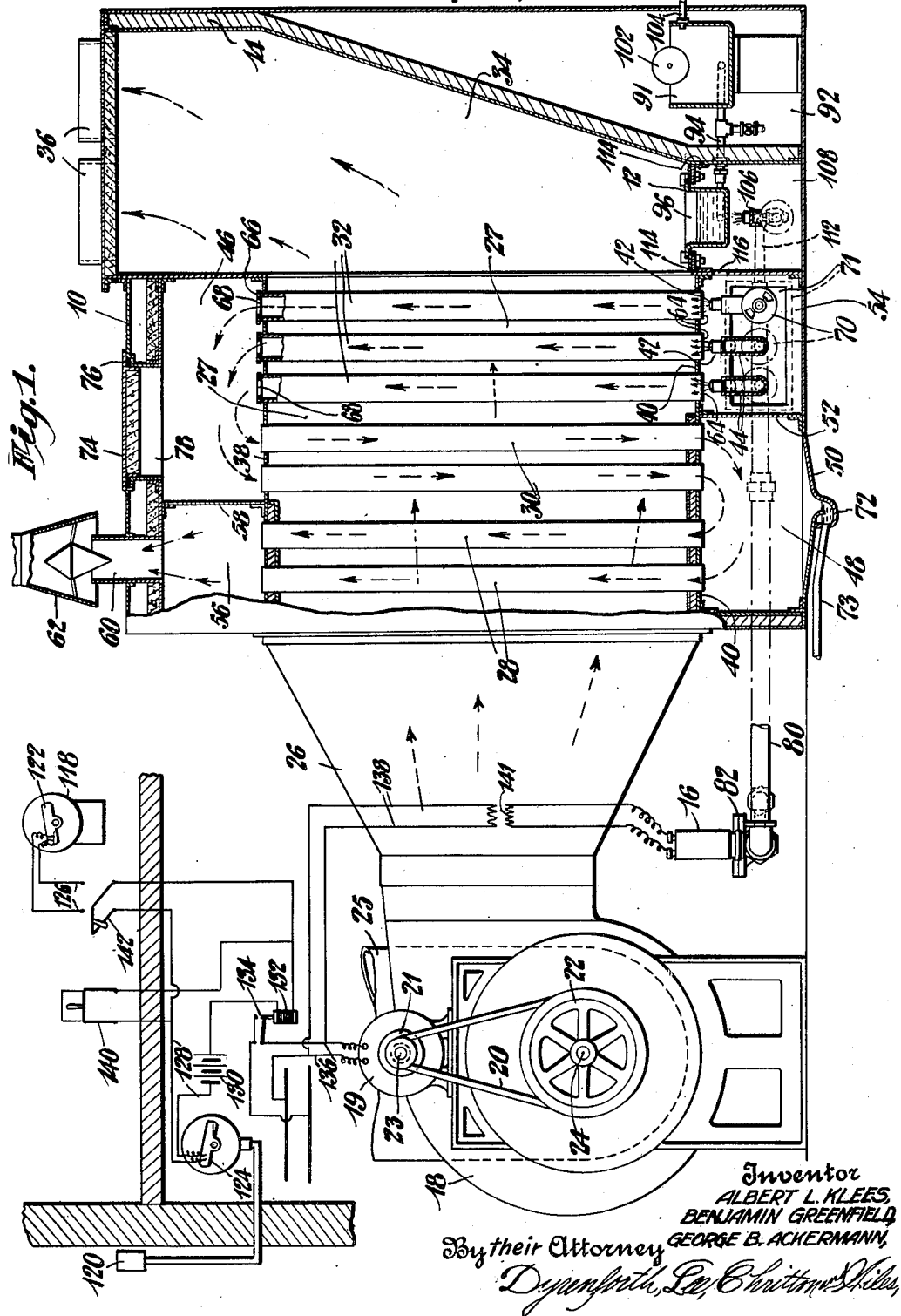

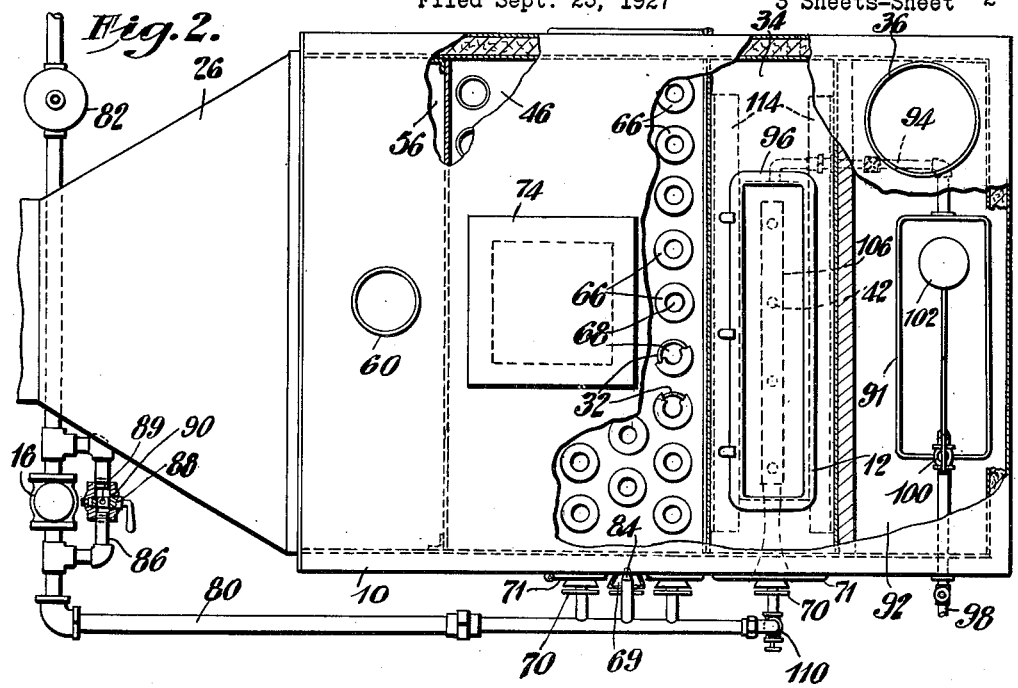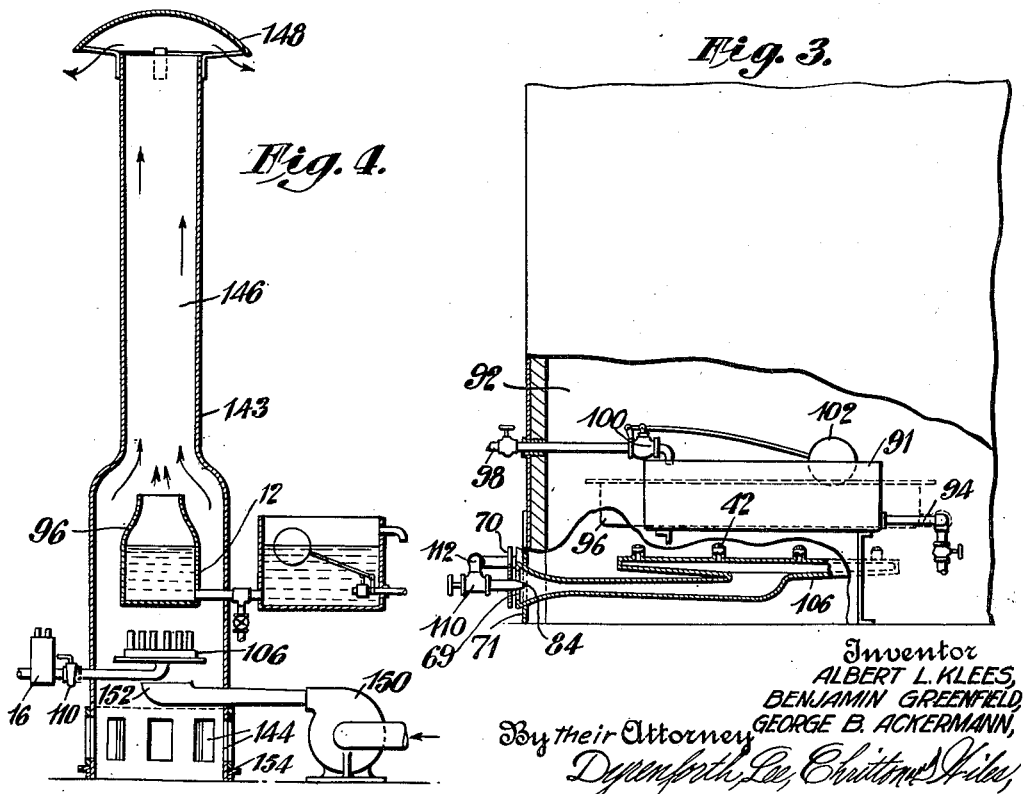

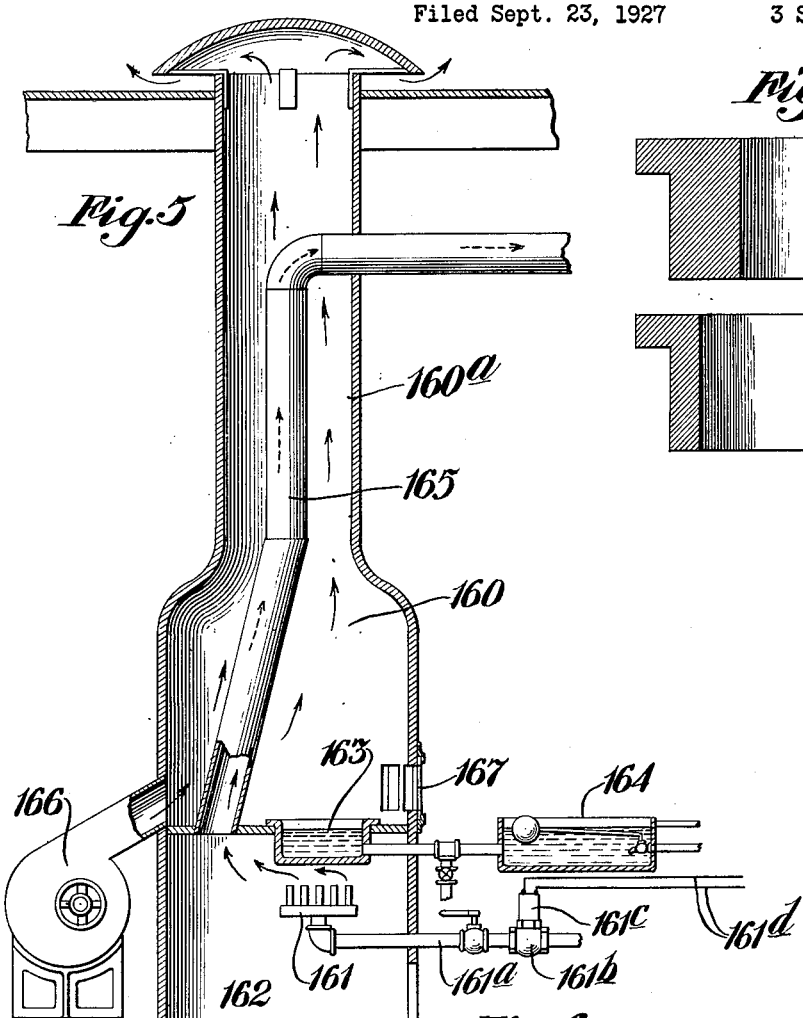
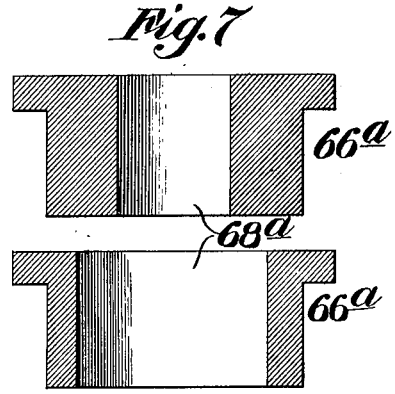
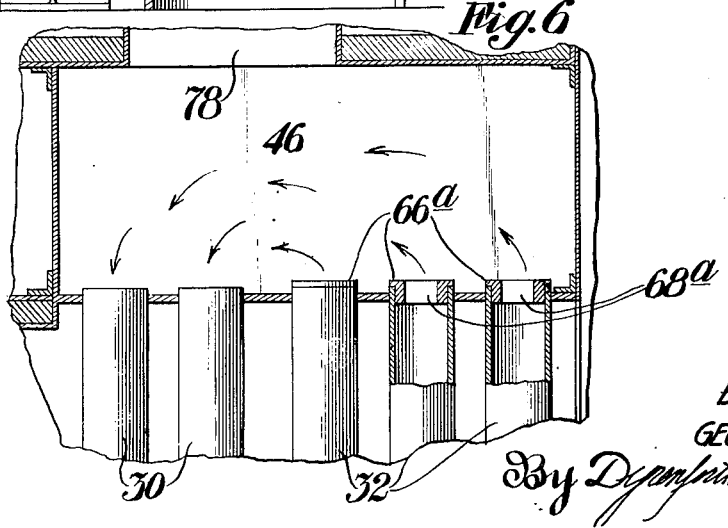

1,674,337

UNITED STATES PATENT OFFICE.

ALBERT L. KLEES, OF NEW YORK, BENJAMIN GREENFIELD, OF JACKSON HEIGHTS, NEW YORK, AND GEORGE B. ACKERMANN, OF CHICAGO, ILLINOIS, ASSIGNORS TO CRIBBEN & SEXTON COMPANY, OF CHICAGO, ILLINOIS, A CORPORATION OF ILLINOIS.

SPACE HEATING AND HUMIDIFYING APPARATUS.

Application filed September 23, 1927. Serial No. 221,465.

This invention relates to space heating and humidifying apparatus, and more particularly to the combination with a domestic heating furnace of an automatic humidifier arranged to supply moisture to the rooms of a dwelling heated by such furnace at a rate which is substantially proportional to the rate at which heat is supplied.

One object of the present invention is to provide space heating and humidifying apparatus embodying a thermostatic control arranged to maintain a substantially uniform proportional relation between the heat and moisture supplied respectively by the heating and humidifying elements of such apparatus.

Another object of the invention is to provide space heating and humidifying apparatus embodying an improved gas fired forced circulation hot air heating unit having a higher efficiency and greater heat transfer capacity per unit area of heating surface than furnaces of this type now available.

Another object of the invention is to provide space heating and humidifying apparatus capable of maintaining the fluctuations above and below predetermined ideal indoor humidity and temperature conditions within reasonable bounds with normal variations in outdoor humidity and temperature.

With these and other objects in view the invention consists in the improved space heating and humidifying apparatus hereinafter described and more particularly defined in the claims.

The various features of the invention are illustrated in the accompanying drawings in which Fig. 1 is a view in vertical section, with parts broken away, of a gas fired forced circulation hot air heating furnace and an automatic humidifier, in combination with electrical control equipment illustrating the preferred apparatus arrangement of the present invention; Fig. 2 is a top plan view, with parts broken away, of the hot air furnace and humidifier illustrated in Fig. 1; Fig. 3 is a broken rear view of the water tank, humidifier and burner shown in Figs. 1 and 2; Fig. 4 is a vertical cross-sectional view of the humidifier element considered as a unit separate from the heating furnace; Fig. 5 is a vertical sectional view of a modified form of the humidifier element considered as a unit separate from the heating furnace; Fig. 6 is a broken sectional view of the vertical flues and compartment above the flues shown in Fig. 1, and showing provision for the use of interchangable choke-devices; and Fig. 7 shows interchangeable choke-devices of different capacities.

Essentially the space heating and humidifying apparatus of the present invention, in its preferred form, embodies a forced circulation hot air heating furnace provided with a series of multiple pass sinuous passages for hot combustion gases disposed in staggered rows with their longitudinal axes at right angles to the path of flow of air, in the heating section of the furnace. The means for creating a forced circulation of air to be heated through the furnace preferably comprises a multiple blade blower positioned on the cold air side of the furnace so that the air to be heated is first brought in contact with the exit or coolest portion of the sinuous combustion passages and finally in contact with the hottest combustion flues just before entering the conduits by which it is distributed to the space to be heated. The apparatus also preferably includes humidifying equipment embodying an evaporating pan disposed within the heat insulated walls of the furnace in a position to supply moisture to the heated air leaving the furnace, said evaporating pan having its own heating element separate and distinct from the main heating elements of the hot air furnace. In its preferred arrangement the apparatus also includes an electrical circuit controlling the supply of fuel to the heating elements of the hot air furnace and to the heating element of the humidifier and also controlling the operation of the air circulating fan, said circuit being in turn under the control of a thermostat responsive to the heat demands of the space to be heated.

Like characters of reference designate corresponding parts of the apparatus throughout the several views.

The preferred arrangement of space heating and humidifying apparatus constituting the subject of the present invention, as it is illustrated in the drawings, comprises a gas fired forced circulation hot air heating furnace 10 and a humidifier 12, both housed within heat insulated walls 14 of the furnace and both having separate heating burners, the gaseous fuel supply to which is regulated and maintained at suitable proportional relationships by means of a thermostatically controlled valve 16. The gas fired hot air heating furnace, as it is shown in Figs. 1 and 2 of the drawings, has associated therewith a multiple blade or sirocco type fan blower 18 arranged to be driven at low speed from a low powered electric motor 19 through a belt 20, and two nests of variable sized pulleys 21 and 22 of graduated size journaled respectively on the drive shaft 23 of the motor and on the blower shaft 24. The blower 18 is arranged to draw a relatively large volume of cool air into its intake pipe 25 from an outdoor source and from the space or rooms to be heated, and to deliver the air under a relatively low pressure and at a controlled velocity through a conveying nozzle 26 to a heating space 27 surrounding a bank of heating flues 28, 30 and 32 in the furnace 10, and thence through a discharge chamber 34 and distributing ducts 36 to the space or rooms to be heated. The heating and combustion flues 28, 30 and 32 are shown mounted vertically in the furnace 10 (in seven parallel rows in the particular furnace design illustrated), each flue having its open ends expanded or rolled into tube sheets 38 and 40. It will be noted that in the furnace design illustrated in the drawing the air to be heated flows at a velocity controlled by the speed of the fan 18 (preferably 500 feet per second or greater) over the outer surfaces of the flues 28, 30 and 32 and in a direction at right angles to the vertical axes of the flues.

At the base of each one of the combustion flues 32 making up the first three rows at the right hand side of the furnace (as illustrated in Fig. 1) there is mounted a burner tip 42 of an atmospheric type gas burner 44, (see Fig. 3) each burner tip 42 being centrally positioned at the base of a corresponding flue 32 so that the gas flame emanating therefrom extends upwardly through the flue along its axis. Normally the combustion of the gas ejected from each of the burner tips 42 is all completed inside of the corresponding combustion flue 32, the hot products of combustion being then discharged into a compartment 46 formed between the insulated roof of the furnace 10 and flue sheet 38. From compartment 46 the hot products of combustion flow downward through return flues 30 (shown as mounted in the furnace in two parallel rows, see Fig. 1) into a subcompartment 48 formed at the base of the furnace between a substantially horizontally positioned base plate 50 and flue sheet 40. A partition 52 forms a gas-tight seal between chamber 48 and a chamber 54 housing the burners 44. From compartment 48 the products of combustion are again directed upwardly through exit flues 28 (of which there are two rows in the illustration) into a compartment 56 (sealed off from compartment 46 by a vertical partition 58) and thence out through a flue connection 60 and past a draft diverter 62 to the atmosphere. Compartments 46 and 48 and flues 32, 30 and 28 form an essentially gastight sinuous (three-pass) passage closed except for the flame entrance openings at the base of tubes 32 and the flue outlet 60. The down draft diverter or draft check 62 is normally provided in the outlet flue 60 in order to break the chimney draft and thereby provide constant draft conditions to insure that the amount of air drawn into combustion flues 32 will be uninfluenced by variations in chimney draft, the furnace being thus allowed to produce its own draft or force to cause the hot gases of combustion to flow through the tubes toward the flue 60 and to draw in sufficient secondary air through annnular openings 64, formed between burner tips 42 and the lower walls of flues 32, to completely burn the gas issuing from each burner tip.

Each one of the combustion flues 32 is shown equipped at its top with a flow retarder or orifice plate 66. These flow retarders are provided with an axial restricted orifice or opening 68 of predetermined area and are designed to equalize and control the draft and thereby insure uniform combustion and distribution of flow of gases and air throughout the tubes 32. It has been found that unless draft retarders such as those illustrated in the drawing are used, there is a tendency in operating the furnace that an unequally distributed draft will be built up in the several tubes, thereby producing a down-flow through some of the tubes while an excess of air is flowing into the other tubes; so that while there may be over-ventilation in some of the individual burner flames, others may not obtain sufficient air to completely burn the gas issuing therefrom.

The primary air for combustion of the gaseous furnace fuel enters the mixing chambers of each of the burners 44 through orifices 69 (see Fig. 3) opening on the outside of the furnace housing 10 and controlled by shutters 70. It has been found that sufficient secondary air for insuring complete combustion of the gas will usually enter the chamber 54 housing the burners 44 even when no special openings are provided in the walls of the chamber 54 for its admission. In order to permit access to the chamber 54 cast iron doors 71 (see Fig. 1) are provided in the end walls of compartment 54, and these doors are preferably provided with air regulating dampers (not shown) so as to afford another means distinct from retarders 66 for controlling the supply of secondary air to the combustion flues 32, thereby insuring that the flames issuing from the burner tips 42 may be operated at the highest temperature possible and with complete combustion.

Since the two rows of exit flues 28 will often be found to have a temperature less than the dewpoint of the moisture-laden relatively cool flue gases passing therethrough, they are normally constructed or lined with some material, such as lead, that will successfully resist the corrosive action of the sulfuric and sulfurous acid laden products of condensation that may normally be expected to collect inside of them. In the drawings the flues 28 have been shown as extending far enough through the flue sheet 40 so that any moisture collected in them may readily drain off and leave the joint between the flue and flue sheet dry. As this condensate drips from the lower ends of the tubes 28 it is collected in a water sealed sump or trap 72 formed in the floor of compartment 48 and drained off from the trap through a pipe 73 to a convenient sewer. The floor 50 of compartment 48 is also preferably constructed or lined with non-corrosive material and its side walls and top (tube sheet 40) are preferably insulated on the outside (air side) in order to prevent the occurrence of condensation on the inside. By thus insulating the side walls and top of compartment 48 it will be allowed to take on the same temperature as the gases passing through the compartment, and these gases will normally have a temperature higher than their dewpoint.

Likewise all of the walls except wall 58 of compartment 56 are preferably insulated on the outside so as to prevent the condensation of water vapor on their inner surfaces, with consequent rapid corrosion unless materials of which they are constructed are given a corrosion resisting treatment. In the above manner all of the condensation from the combustion gases is confined to exit flues 28, so that these flues are the only ones that need be constructed or lined with corrosion proof material and a minimum expense is involved in making the whole furnace safe against the rapid corrosion and deterioration experienced by most thermally efficient gas burning equipment. Another advantage of removing a portion of the water vapor from the flue gases during their passage through flues 28 is that there is a reduced tendency for condensation in the flue 60, and consequently a lower resultant deterioration of the flue.

An explosion door 74 is preferably provided in the top of compartment 46 in order that the furnace structure may be relieved of any excessive internal pressures accidently produced by careless lighting of the gas burners or by an accidental accumulation and ignition of an explosive mixture of air and gas in the flue sections or in the compartments 54, 46 and 48. This explosion door is normally held down by its own weight against an annular asbestos gasket 76 to form a gastight joint at the top of the furnace. Particular care is taken in insuring a gastight joint between the door 74, the gasket 76 and its seat, for the reason that in operation of the furnace the pressure in compartment 46 is normally maintained slightly above atmospheric, so that any leak at this point would permit the escape of flue gases into the furnace room. It will be noted that by mounting door 74 at the top of chamber 46 in the manner illustrated in the drawing a manhole 78 is at the same time provided affording easy access to the compartment 46 and thereby permitting rapid inspection of and changes in the size of draft retarders 66.

Gas is supplied to the primary air mixing chambers of the atmospheric type furnace gas burners 44 through a service pipe 80 which leads off from the service main (not shown), the gas passing in turn through a gas pressure regulating valve 82 (designed to maintain the gas on its delivery side at a uniform pressure,—see Fig. 2) and thence normally through the thermostatically controlled solenoid valve 16. Valve 16 when wide open will allow gas to flow under uniform pressure to the individual burners 44 at a constant rate which is proportional to the size of respective orifice spuds 84 (see Fig. 3) through which gas passes from the pipe 80 into each individual atmospheric burner mixer. Valve 16 is by-passed by a connection 86 equipped with a manually operated stopcock 88. Normally this stopcock (illustrated in wide open position) will be closed, but a small hole 89 is drilled through the plug of the cock at right angles to the main orifice 90 to pass a small flow of gas to the burners of the furnace and humidifier when the thermostatically operated valve 16 is closed and the blower 18 inoperative; in other words to allow gas to flow to the furnace burners at a rate sufficient to maintain a low flame when the air circulation through the furnace and ducts 36 is by natural gravity flow. The arrangement above described, whereby a low flame is maintained at the furnace burners during periods in which the main thermostatically controlled fuel valve is closed, permits what is commonly known as the high-low fire principle of burner operation. The stopcock 88 and by-pass 86 are shown as being of the same size as line 80, in order that by opening the stopcock a full supply of gas may be furnished to the furnace burners through orifice 90 in the event of failure of the thermostat control system or of the automatic valve 16. One big advantage resulting from the operation of the furnace at low capacity and under natural gravity air circulation during periods in which the thermostat which controls valve 16 is not calling for heat is to prevent the occurrence of condensation in the various sections of the furnace after it is initially lighted, outside of tubes 28, and also to insure the flow of a small amount of heat to maintain desired uniform temperatures in the rooms or other space being heated even during periods in which the thermostat is not calling for heat.

Provision is preferably made for controlling the electric motor 19 driving fan 18 from the same thermostat which controls the operation of gas valve 16. In other words, the fan 18 is preferably started up when valve 16 is opened, and closed down when valve 16 is closed. With this arrangement the fan is not in operation when the furnace is operating at a low rate on the gas by-passed through line 89 in valve 88, and as the flow of air through the heating system during such periods is by gravity or natural circulation there is therefore no consumption of electrical energy.

The humidifier 12 comprises essentially a constant level water supply tank 91 mounted within an outer compartment 92 of the furnace casing and communicating by means of a pipe connection 94 with an evaporating pan 96, mounted in the base of compartment 34 with its open top exposed to the hot air entering compartments 34 from the heating space 27 of the furnace. Water is maintained in container 91 at an essentially constant level by means of a supply connection 98 (see Fig. 3) having a float valve 100 actuated by a float 102. An overflow 104 is provided to assist in maintaining a constant level in tank 91 in event of failure of float valve 100 to seat tightly. The tank 91 with its pipe connection 94 serves to feed water to the evaporating pan 96 as fast as water is evaporated from the pan through the action of heat supplied by an atmospheric type gas burner 106 mounted in a chamber 108 immediately beneath the evaporating pan 96. The burner tips and the Venturi throat mixing chamber of burner 106 are preferably analogous in construction with the main furnace burners 44. It will be noted that in the apparatus assembly illustrated in Figs. 1, 2 and 3 the fuel supply to the gas burner 106 is controlled by the main thermostatically controlled solenoid valve 16 and also by a manually operated regulating cock 110 disposed in a line 112 connecting the mixing tube of the burner 106 with an extension of main gas supply line 80. The maximum rate at which gas is burned by burner 106 is thus regulated by means of a manual setting of the valve 110. By reason of the small aperture 89 in the stopcock of by-pass valve 88 burner 106 may be continuously operated with the combustion of a small amount of gas and a low flame in accordance with the high-low fire principle even when the main solenoid gas valve 16 is closed. It will be noted that in the arrangement of the humidifier illustrated in the drawings the evaporating pan 96, together with brackets 114 by which it is supported at the base of compartment 34, form a gas-tight closure for the top of compartment 108 housing burner 106. The products of combustion of the gas burned by burner 106 beneath the evaporating pan 96 are led off from compartment 108 through an opening 116 in the left hand wall thereof, and pass upwardly through the tubes 32, mingling with and supplementing the heat of the gas flames issuing from main burners 44.

In the arrangement of hot air heating furnace and humidifier illustrated in Figs. 1, 2 and 3, it will be observed that when the main burners 44 of the furnace are operating at full capacity the burner 106 of the humidifier is also operating at a proportional rate. This is also true when the main furnace burners are operating at a reduced rate (with natural gravity air circulation through the furnace gas by-passed by orifice 89 in valve 88). The manually operated stop cock 110 in the supply line to the humidifier burner affords a means of adjusting the proportional rate of burning gas in the main heating furnace burners 44 and in the humidifier burner 106, and thus permits an indirect control of the proportionate volume of water which will be evaporated and discharged into the warm air which is being delivered by the furnace 10 to the space or rooms being heated. Since the amount of gas burned by burner 106 (no matter what the setting of cock 110) is always proportional to the amount of gas burned by the main burners 44 it follows that the amount of water evaporated from the pan 96 is substantially proportional to the amount of heat delivered by the furnace 10 through flues 36 to the space to be heated. The same thermostat which controls the operation of the motor driving blower 18 and solenoid valve 16, and which therefore may be said to control the supply of heat from the furnace to the space to be heated, also controls indirectly the amount of gas burned by humidifier burner 106 and accordingly the amount of moisture delivered to the space to be heated.

In Fig. 1 of the drawings an indoor thermostat 118 and an outdoor thermostat 120 are shown, either of which may be employed to effectuate an automatic thermostatic control of the operation of fan motor 19 and of solenoid valve 16 in the fuel supply line. Thermostats 118 and 120 operate in a well-known manner to throw mercoid tipping switches 122 and 124, with which they are respectively associated, into or out of a position in which the liquid contact medium therein will effect a closure of respective electrical circuits 126 and 128. Circuits 126 and 128 when closed supply current from a source of power 130 to energizing coils 132 of a solenoid switch 134 in main power circuits 136 and 138, respectively, supplying electrical energy to drive the motor 19 and to operate the solenoid valve 16. Switches 140 and 142 are provided in the circuits of the respective thermostatic switches 124 and 122 in order that the operation of the motor 19 and solenoid valve 16 may be placed under the sole control of the out-door thermostat 120 or under the joint control of the indoor thermostat 118 and outdoor thermostat 120.

The particular arrangement of the automatic humidifier 12 illustrated in Fig. 4 is intended for use in cases where it is impracticable or undesirable to operate the humidifier in direct conjunction with, or as a part of the same apparatus assembly with, the main heating furnace. The various parts of the automatic humidifier apparatus illustrated in Fig. 4 are numbered to correspond with the parts of the humidifier shown in Figs. 1, 2 and 3 performing a like function. When the humidifying device of Fig. 4 is used in conjunction with separate thermostatically controlled space heating means (not shown) the solenoid valve 16 will preferably operate under a thermostatic control to regulate the flow of gas or other fluid fuel to the burner 106 of the humidifier. The electrical circuit operating the valve 16 will then preferably be connected in parallel with the circuit controlling the heat supply of the thermostatically controlled space heater through a suitable voltage transformer 141 (see Fig. 1), with a circuit hook-up resembling that illustrated in Fig. 1. 143 is a suitable heat insulated housing provided with openings 144 at its base to permit the entry of air at the floor line, and having a chimney 146 leading off from its top to carry the mixture of steam, warm air and products of combustion from the gas burner 106 to a point preferably near the ceiling of the space to be heated, where it is discharged and distributed horizontally by a suitable deflector 148. Due to the chimney action of the column of hot moistened air and gaseous products of combustion passing upwardly through the flue 146 a relatively rapid flow of air will be induced through the openings 144 and through the humidifier, so that the steam discharged from the top of the evaporating pan 96 will be materially diluted to produce a mixture of air and superheated water vapor together with the products of combustion from burner 106. It would of course be undesirable to discharge raw steam undiluted with air into the space being humidified for the reason that to do so would produce an atmosphere in the neighborhood of the humidifier having a humidity exceeding 100%, thereby creating a fog which on coming in contact with cold surfaces such as windows or cold walls would deposit moisture in the shape of dew. Another great advantage of causing a good flow of air through the humidifier is to secure sufficient motion in the space to be humidified to insure a more or less even distribution of the humidified air. A blower 150 is shown in Fig. 4, designed to supply relatively large volumes of fresh air through its discharge nostril 152 into the base of the humidifier casing 143, thereby affording a means insuring a positive supply of the desired volume of air to the humidifier in the event that it is found that the volume of air which can be drawn into the humidifier through the openings 144 by induced draft is insufficient to supply satisfactory distribution of humidified air in the space to be humidified. When the air supply for the humidifier 12 is being furnished by the blower 150 a shutter 154 is provided at the base of the housing 143 for closing the openings 144.

It will be noted that if 50% of the heat generated by the gas burner 106 of the humidifier illustrated in Fig. 4 is used to evaporate water from pan 96, the remaining 50% is used to obtain air dilution and humidity distribution. Furthermore, since the temperature of the air passing over the top of the pan 96 is relatively high, (much above room temperature) it will have an increased capacity for absorbing moisture. Since the products of combustion of the humidifier burner illustrated in Fig. 4 are discharged directly into the space or room to which moisture is supplied, the humidifier will have a 100% thermal efficiency when operating in conjunction with some type of space heating equipment. Of course with a humidifier of this type it is very important to use a gas burner 106 that will give complete and odorless combustion, as well as one in which the cone of the burner flame will not be allowed to come in contact with the water cooled surface of the evaporating pan. Otherwise carbon monoxide might be discharged with the products of combustion into the living quarters. With this type of humidifier it is also desirable to equip the burner 106 with some sort of safety pilot device (not shown) which will operate to cut off the flow of gas in case for any reason the flame becomes extinguished.

The heating element or furnace of the present apparatus may, if desired, be so constructed that instead of positioning the draft retarder 66 and the explosion doors 74 at its top the explosion door will be located in the base of the furnace, for example opening out of compartment 48. Likewise that portion of header 38 to the right of partition 58 may be eliminated from the furnace by combining the two sets of combustion and return flues 30 and 32 into one set of integral (inverted U) ∩-shaped flues equipped with draft retarders in the ends opening into compartment 48. With this latter arrangement of ∩-shaped tubing and explosion door the top of the furnace can be made into one insulated integral unit, and the construction cost of the furnace and also the radiation losses therefrom can be considerably reduced.

By using draft retarders 66 in the ends of the first set of combustion tubes 32 it is possible not only to make all of the combustion tubes "draw" uniformly but also to make these draft retarders the sole means of regulating the draft on the furnace, thus permitting the use of cheaper construction for the walls enclosing burner chamber 54. Thus without the use of properly sized draft retarders it would be necessary to make the walls of the burner chamber substantially airtight and to construct the secondary air regulating dampers so that they can be closed practically to a ground joint, particularly in cases where it is desired to vary the rate of gas burning by the furnace over a wide range. By using properly sized draft retarders, however, it is possible to leave the bottom burner compartment wide open without any provision for air dampers, and to effect the draft control solely by means of the draft retarder. The high temperatures generated in the combustion flues 32 of the furnace are normally sufficient to produce the draft head required to push the cooler flue gases through the other two sets of return and exit flue passages 30 and 28. Accordingly there is normally an appreciable pressure in the chamber 46 connecting the upper end of the first and second tube passes. The primary functions of the draft retarders 46 are to dissipate enough of this draft head so that the flames in tube 32 will not be over-ventilated and to equalize the draft and gas flow through the individual tubes 32.

The capacity of the gas burners 44 and 106 can be changed by changing the diameters of orifice spuds or nipples 84 feeding gas from the pipe 80 to each burner mixer. The pressure regulator 82 is provided in the gas supply pipe in order to ensure a uniform flow of gas to the several furnace burners at both high and gravity flow rates. With a given supply of gaseous fuel the capacity of the furnace is adjusted by setting the gas pressure regulator 82 and by choosing properly sized gas burner orifice spuds 84. By supplying gas to pipe 80 under a fixed pressure the gas rate and resultant capacity of the furnace can be easily adjusted, the maximum gas rate being determined by the size of orifice spuds 84 and the minimum gas rate by the size of bleeder opening 89 in by-pass valve 88. The degree of over-ventilation of the furnace and hence its efficiency is determined by the sizes of the orifices 68 in the draft retarder 66. The temperature of the outgoing warm air from the furnace is primarily determined by the speed of the blower fan 18. In order to adjust the speed of the fan 18 to overcome varying conditions of air flow resistance in ducts 36 the fan and its driving motor are provided with the multiple step pulleys 22 and 23.

By proper setting of an outdoor thermostat 130 wired in series with the solenoid 16 in the fuel supply line to the humidifier burner (see Fig. 4) or with a second solenoid valve (not shown) positioned in the humidifier gas line 112, (see Figs. 1 and 2) and wired in parallel with solenoid valve 16, the humidifier can be kept inoperative until some predetermined minimum outdoor temperature is reached, say for example 40 degrees Fahrenheit. Investigation has shown that indoor humidity control is not really needed with outdoor temperatures higher than 40° F. In case it is desired to hold the indoor humidity between closer limits than is provided by the above thermostatic control a wet bulb thermostat, or a humidostat, or a hydrostat may be used to control the solenoid gas valve 16 on the humidifier fuel supply line (not shown). By the use of such a humidity-responsive device controlling the fuel supply to the humidifier burner in combination with the ordinary room thermostat for controlling the room temperature, it is possible to keep the humidifier out of operation until the indoor humidity has reached a predetermined low level. Moreover with a suitable thermostatic relay system the one solenoid gas valve can be controlled by both the room thermostat and the wet bulb thermostat so that the wet bulb thermostat can not act to turn on the humidifier burner unless the burners of the heating furnace are also in operation.

The forced circulation hot air heating furnace illustrated in the drawings has numerous advantageous features. In the first place, its construction provides for a multiple pass sinuous flow of heating gases through cylindrical heating flues mounted at right angles to the forced flow of circulating air, thereby raising the heat transfer capacity of the furnace per unit area of tubular heating surface considerably above what would be obtainable for a similar furnace arranged for direct uniflow or counterflow circulation of the heating medium and the medium being heated. By circulating the air to be heated at a relatively high velocity through the bank of heating tubes and by arranging the tubes in one row in a staggered relationship to those in the next row (see Fig. 2) so as to cause the circulating air to take a zigzag course through the furnace, thereby breaking up the moving body of air into a number of small turbulent streams, the rate of heat transfer from the tubes to the air is still further increased. In order to permit of a relatively high rate of heat transfer between the tubes and the air per unit area of tube heating surface the blower used in circulating the air is preferably powered to force the air through the furnace at as high a velocity as will be economically possible from the standpoint of the power required. By mounting the gas burners in the flues farthest removed from the air inlet to the furnace, and thereby taking advantage of the counterflow principle to maintain the greatest mean temperature differential between the heating tubes and the air to be heated, the thermal efficiency of the furnace is further increased and a lower outlet flue gas temperature is maintained.

By centering a small gas flame in the base of each of the combustion tubes 32 of the burner it is possible to operate the tubes at a high temperature without danger of burning out or overheating the tubes or tube sheets. In normal operation the flame from each burner tip extends axially up through practically the full length of the tube, and by employing draft retarders in the opposite end of the tube a very uniform distribution of heat is obtained to all parts of the combustion tube. By thus centering the hot flame within the tube and uniformly distributing the flame throughout the full length of the tube a greater mean temperature difference is maintained between the hot gases (or flame) on the heating side of the tube and the air to be heated on the other side of the tube, and the air is thus heated to a uniform degree throughout all sections of the furnace. It has been found that the temperature of the hot gases may be safely maintained as high as can be produced by a gas burner flame with the flame over-ventilation at a minimum. Furthermore by operating the gas burner flame with a minimum degree of over-ventilation and by so positioning the burners with respect to the tubes that the flames are completely surrounded by the walls of the tubes, a very rapid and complete heat transfer by direct radiation is obtained.

It has been found possible to pass a relatively large volume of air at a relatively high velocity through the furnace of the present apparatus, with resultant relatively low air temperatures at the register outlets into the rooms to be heated, without the use of excessive power for driving the air circulating fan, by using a fan 18 of the multiple blade (so-called Sirocco) type and operating the fan at a relatively low speed by a belt connected to a standard speed electric motor. As previously explained the heating furnace of the present apparatus is preferably designed for operation on the "high-low fire" principle of control, thus offering a decided advantage over other types of domestic heating systems designed for forced air circulation in that a large portion of the heating will be done at relatively high thermal efficiency with air flowing through the system by natural or gravity head and without any electrical power consumption for driving the circulating fan. Other advantages obtained by operating the furnace on the high-low fire principle of control are that it is possible to maintain a more uniform and comfortable temperature within the space or rooms being heated, because periods during which no heat is entering the room are avoided and the room air is never allowed to become entirely stagnant. Furthermore, by this principle of control the tubes of the furnace are always maintained warm so that excessive sweating of the inner surface of the tubes is avoided.

When properly adjusted the apparatus of the present invention will so proportion the humidity supply to the heat supply as to prevent too high a rate of evaporation and humidity supply, leading to the condensation of moisture within the given space, and also to guard against too little evaporation and too low a rate of humidity supply leading to discomfort on account of dryness of the heated air.

By providing the humidifier of the apparatus of the present invention with its own individual thermostatically controlled heat supply, preferably a gas burner, it is possible by controlling the amount of fuel supplied to said burner to control indirectly and very precisely the amount of water evaporated by the humidifier. The humidity control of the present apparatus includes an automatic control of temperature in the space to which such humidity is to be supplied. Likewise for greatest comfort and health the present invention contemplates control not only of temperature and humidity conditions but also of air motion throughout the rooms of a dwelling.

The principle of control of the automatic humidifier element of the apparatus of the present invention has its basis in the observation that for any given outdoor humidity, as for example the normal outdoor humidity, the relative indoor humidity without some automatic humidity control will vary approximately in direct proportion to the outdoor temperature over a range from zero degrees to 70° F. Accordingly by supplying moisture for humidification at a rate which is inversely proportional to this outdoor temperature range throughout the heating season it is possible to hold an essentially constant indoor humidity so long as the outdoor humidity remains unchanged. It can be readily observed that an indoor temperature of 69° to 70° F. is far from comfortable without some kind of humidity control when the outdoor air is much below 30° F. Practically it has been found that the results do not justify the cost of maintaining an indoor humidity much above 40% when the outdoor temperature is at 30° F. or less. The human body can easily accommodate itself to humidity variations of from 35% to 60%. It has also been found that if the humidity is much above 40% a sweating of single glass windows takes place when outdoor temperatures are below 30° F. The humidity control of the present apparatus has been designed on the assumption that if the temperature of the room or space to be heated is to be held constant at a given temperature, say 69° F., the humidity should not be allowed to go lower than 28% or higher than 53% and for maximum comfort should stay close to 40%. In the same way if it is desired to maintain a constant humidity of 40% the temperature should be kept between the limits of 66° and 74° F. and for maximum comfort it should stay close to 69° F. By adjusting the thermostatic control elements of the present invention to maintain 40% humidity conditions in the space to which heat and moisture are being supplied at the time that the outdoor humidity is normal and when the outdoor temperature is at 30° F. it is possible to maintain the fluctuations of indoor humidity above and below 40% within reasonable bounds with normal daily variations in outdoor humidity and temperature. This is especially true for outdoor temperatures in the neighborhood of 30° F. or below.

It will be understood that while in the above description gas has been referred to as the preferred fuel for operating the heating elements of the apparatus, oil or other fluid may be used with very little modification in the design of the apparatus shown in the drawings.

In Fig. 5 is shown a modified humidifier well adapted for use in a house equipped with any ordinary heating apparatus (not shown). In this modification, a humidifying chamber 160 is provided which is heated by a burner 161 mounted in a sub-chamber 162. The fuel pipe 161ª is equipped with a valve 161ᵇ controlled by an electro-magnet 161ᶜ having a circuit 161ᵈ controlled by a thermostat (not shown) mounted in one of the rooms heated by the ordinary heating apparatus. This thermostat may control such heating apparatus as well as the humidifier.

In the floor of chamber 160 is mounted the evaporator-pan 163 which is automatically supplied with water from tank 164. Burner 161 may serve to heat both the pan 163 and the chamber 160, or if desired more than one burner may be provided.

The burner-chamber 162 has a gas-flue 165 leading through the chamber 160 and extending to a chimney (not shown). Chamber 160 (if the device is located in a basement) has a flue 160ª leading to rooms to be humidified. Air is supplied to chamber 160 either by a blower 166 (thermostatically controlled, if desired), or through a natural-draft device 167.

In Fig. 6, the combustion tubes 32 are shown equipped with removable choke-devices or draft-retarders, 66ª, provided with passages 68ª. In Fig. 7, interchangeable retarders 66ª are shown, and it will be noted that the passages 68ª thereof differ in size.

It will be understood from the description given that the invention may have various embodiments. In the present application, it is the intention to claim the invention generically and in one specific embodiment. In our pending application, Serial No. 197,697, filed June 9, 1927, we specifically claim the embodiment shown herein in Figs. 1–3.

It is to be understood that the detailed description herein given is for clearness of understanding only, and that it is the intent to claim the invention as broadly as permissible in view of the prior art.

What we regard as new, and desire to secure by Letters Patent, is:

1. Space heating and humidifying apparatus having, in combination, a furnace adapted to supply heat to a definite space, means for automatically regulating the heat supplied by said furnace in accordance with the heat demand, a humidifier including an evaporating pan for delivering moisture to said space, a fluid fuel burner adapted to supply heat to said pan to evaporate water therefrom, and means under the control of said automatic regulating means for controlling the supply of fuel to said fluid fuel burner to maintain a substantially proportional relation between the amount of moisture and the amount of heat delivered to said space respectively by said humidifier and by said furnace.

2. Space heating and humidifying apparatus having, in combination, a furnace adapted to supply heat to a definite space, a thermostat for measuring the heat demand of said space, means under the control of said thermostat for regulating the heat supplied by said furnace in accordance with said demand, a humidifier arranged to supply moisture to said space and including an evaporating pan, a fluid fuel burner for heating said pan to evaporate water therefrom, and means under the control of said thermostat for regulating the supply of fuel to said burner to maintain a substantially proportional relation between the amount of moisture supplied by said humidifier and the amount of heat delivered by said furnace.

3. Space heating and humidifying apparatus having, in combination, a fluid fuel fired hot air heating furnace, means for maintaining a forced circulation of air in contact with the combustion elements of said furnace and thence through the space to be heated, a thermostat for measuring the heat demand of said space, means under the control of said thermostat for regulating the fuel supply to said furnace in accordance with the heat demand, means under the control of said thermostat for controlling the rate of circulation of air through said furnace, a humidifier for supplying moisture to said space and including an evaporating pan, a fluid fuel burner for heating said pan to evaporate water therefrom, and means under the control of said thermostat for regulating the supply of fuel to said burner to maintain a substantially proportional relation between the amount of moisture supplied by said humidifier and the amount of heat delivered by said furnace.

4. A space heating system having, in combination, a furnace arranged to supply heat thereto, thermostatically controlled means for proportioning the rate of heat supply in accordance with the heat demand of said space, and a humidifier for supplying moisture to said space comprising an evaporating pan, means for automatically maintaining a substantially uniform volume of water in said pan, a fluid fuel burner arranged to supply heat to said pan to evaporate water therefrom, and a valve in the fuel supply line of said burner under the control of the same thermostat controlling the automatic heat regulating means.

5. A space heating system having, in combination, a gas fired hot air heating furnace, a humidifier including an evaporating pan mounted in the path of the hot air delivered by said furnace and adapted to supply moisture directly thereto, a gas burner mounted beneath said evaporating pan, means for automatically maintaining a substantially uniform volume of water in said pan, a thermostat for measuring the heat demands of said system, and separate means under the control of said thermostat for regulating respectively the supply of gas to the heating elements of said furnace, the rate of circulation of air therethrough, and the supply of gas to said humidifier burner, whereby a substantially proportional relationship is maintained between the amount of moisture and the amount of heat delivered to said space respectively by said humidifier and by said furnace.

6. In space heating and humidifying apparatus the combination of a humidifier element including an evaporating pan, means for automatically maintaining a substantially constant level of water in said pan, a fluid fuel burner arranged to supply heat to said pan to evaporate water therefrom, a thermostat responsive to changes in outdoor temperature, and means under the control of said weather-responsive thermostat for varying the supply of fuel to said burner in inverse proportion to changes in outdoor tempertures below a predetermined minimum limit.

7. In space heating and humidifying apparatus, the combination of a forced circulation hot air heating furnace including a plurality of heating flues disposed in staggered rows with their longitudinal axes at right angles to a stream of air to be heated, a fluid fuel burner centered in the longitudinal axes of such of said combustion tubes as make up the rows lying nearest the point of discharge of said air circuit from said furnace, said combustion tubes being arranged to form a sinuous closed path for conducting the products of combustion emitted from said burners in a counterflow direction to that of the air passing through the furnace, and means disposed in such of said flues as have burners centered in their ends for equalizing the draft and the distribution of combustion gases and air in all of said flues.

8. In space heating and humidifying apparatus, the combination of a hot air heating furnace comprising an air heating chamber, heating flues extending therethrough, means for conducting air to and away from said air heating chamber, means for supplying heat to said flues, and a humidifying apparatus comprising an evaporating pan, a heating element associated therewith, and means for maintaining a predetermined ratio between the heat supplied to said furnace heating flues and the heat supplied by the humidifier heating element.

9. In space heating and humidifying apparatus, the combination of a hot air heating furnace, means for circulating air to be heated through the furnace, means for circulating hot products of combustion through the furnace, a main burner for generating such hot products of combustion, a humidifier adapted to supply moisture to the air circulated through the furnace, a humidifier burner, a thermostat, and means under control of said thermostat for controlling the supply of fuel to said main burner and to said humidifier burner.

10. In space heating and humidifying apparatus, the combination of a heating furnace, a main burner for supplying heat to said furnace, a humidifier, a burner for supplying heat to said humidifier, a fuel supply pipe common to both of said burners, means for adjusting the ratio between the fuel supplied to said respective burners, and a thermostatically controlled valve in said supply pipe.

11. In space heating and humidifying apparatus, the combination of a hot air heating furnace, a main fluid fuel burner for supplying heat to said furnace, a humidifier, a fluid fuel burner for supplying heat to said humidifier, a blower for circulating air through said furnace, electrically controlled means for operating said blower, and electrically controlled means for regulating the supply of fuel to said burners, both of said electrically controlled means being under the control of a thermostat.

12. In space heating and humidifying apparatus, the combination of a hot air heating furnace including an air heating chamber, heating flues extending across the path of air passing through said chamber, main fluid fuel burners associated with said heating flues, a hot air conduit connecting said air heating chamber with the space to be heated, a humidifier adapted to supply moisture to the heated air on its way to said conduit, a burner associated with said humidifier, a blower communicating with the air heating chamber, an electric motor for driving said blower, an electrically operated valve controlling the supply of fuel to the main burners and to said humidifier burner, and a thermostat controlling the operation of said motor and said valve.

13. In space heating and humidifying apparatus, the combination of an air heating furnace including an air heating chamber, a hot air flue affording an outlet therefrom, an air inlet flue opening into said air heating chamber, sinuous combustion flues extending through said air heating chamber, fluid fuel burners disposed co-axially with one end of each of said flues, a humidifier having an evaporating pan opening into the lower portion of said hot air flue, a humidifier burner associated with said evaporating pan, a fuel supply pipe communicating with all of said burners, and a passage for conducting products of combustion emanating from said humidifier burner into and through the heating flues of said furnace.

14. In space heating and humidifying apparatus, the combination of a hot air furnace including an air heating chamber, a hot air flue forming an exit for air from said chamber, means for circulating air through said chamber, combustion flues extending through said air heating chamber adjacent said hot air flue, return flues and exit flues for combustion gases extending through said air heating chamber respectively farther removed from said hot air flue, a main fluid fuel burner disposed in one end of each of said combustion flues, a humidifier embodying an evaporating pan communicating with said hot air flue, a fluid fuel burner associated with said evaporating pan, a constant level water supply chamber communicating with said evaporating pan, and a float control valve controlling the admission of water to said supply tank.

15. Space heating and humidifying apparatus including a heating unit, means connecting said heating unit with the space to be heated, a humidifying unit in communication with said connecting means and including an evaporating pan, and means for supplying heat thereto, a temperature responsive thermostat, and means under the control of said thermostat for controlling the supply of heat to said evaporating pan.

16. In space heating and humidifying apparatus, in combination, a humidifier embodying an evaporating pan, a fluid fuel burner associated therewith, a water supply tank communicating with said evaporating pan and equipped with a float controlled water inlet valve, a fuel supply line leading to said burner, a thermostat, and means under the control of said thermostat for controlling the fuel supply to said burner.

17. In space heating and humidifying apparatus, in combination, a humidifier element including an evaporating pan, a fluid fuel burner associated therewith, a constant level water supply tank communicating with said evaporating pan, a fuel supply pipe for said humidifier burner, a heating element, a fuel supply pipe for said heating element, a valve controlling the supply of fuel to both of said supply pipes, an electro-magnetic device controlling the operation of said valve, and a thermostat controlling the operation of said electro-magnetic device.

18. In space heating and humidifying apparatus, in combination, a humidifier element embodying an evaporating pan, means for maintaining a constant level of water in said evaporator, a fluid fuel burner for heating said evaporator, a conduit communicating with said evaporating pan and arranged to convey moist air from said evaporating pan to a space to be humidified, a thermostat responsive to temperature changes in said space, and a valve under the control of said thermostat for controlling the supply of fuel to said humidifier burner to proportion the supply of moisture delivered by said humidifier in accordance with the temperature in said space.

19. In combination, means for supplying a current of heated air to a room, and a humidifier exposed to said current of air, said humidifier comprising an evaporator equipped with means for automatically supplying water thereto and equipped also with a burner, a thermostat in said room, and means controlled by said thermostat for supplying fuel to said burner.

20. In combination, a humidifier and associated means for supplying steam and air to a room, said humidifier having an evaporator, a burner associated therewith, and having also an automatic water supply device, a pipe equipped with a valve and adapted to supply fluid fuel to said burner, and a room thermostat device controlling said valve.

21. A humidifier for the purpose set forth, comprising an evaporator-pan, automatic means for maintaining a water supply in said pan, and a burner associated with said pan and provided with a fuel supply pipe equipped with a valve having associated therewith an electric device adapted to operate said valve.

22. In a furnace, means for circulating through the furnace air to be heated, means for circulating through the furnace products of combustion, a main burner for heating purposes, a humidifier adapted to supply vapor to the air passing through the furnace, a burner for heating said humidifier, and a room-thermostat controlling fuel supplied to said burners in a predetermined ratio.

ALBERT L. KLEES.
BENJAMIN GREENFIELD.
GEORGE B. ACKERMANN.